United States Patent [19]

Okumoto et al.

[11] Patent Number: 4,486,480

[45] Date of Patent: Dec. 4, 1984

[54] RUBBER HOSE COMPRISING A LIQUID NITRILE-BUTADIENE COPOLYMER INCORPORATED INTO A PARTIALLY HYDROGENATED UNSATURATED ACRYLONITRILE-BUTADIENE COPOLYMER

[75] Inventors: Tadaoki Okumoto, Inazawa; Masatoshi Sugimoto, Kounan; Takashi Kawazoe, Yotsukaichi; Seiichi Sahara, Nagoya; Tetsuo Yamada, Toyota; Kinrou Hashimoto, Yokohama; Masayoshi Ichikawa, Ichinomiya; Kenichi Funato, Iwakura, all of Japan

[73] Assignees: Toyoda Gosei Co., ltd., Nishikasugai; Toyota Jidosha Kabushiki Kaisha, Toyota, both of Japan

[21] Appl. No.: 442,977

[22] Filed: Nov. 19, 1982

[30] Foreign Application Priority Data

Dec. 30, 1981 [JP] Japan .............................. 56-213272
Dec. 30, 1981 [JP] Japan .............................. 56-213273

[51] Int. Cl.$^3$ ...................... F16L 11/04; C08K 5/29; B32B 27/08
[52] U.S. Cl. ...................................... 428/36; 524/205; 524/208; 524/209; 524/527; 525/233; 525/238; 525/338; 525/315
[58] Field of Search ............... 524/205, 209, 208, 527; 428/36; 525/336, 338, 330, 233, 238

[56] References Cited

U.S. PATENT DOCUMENTS 3,505,274 4/1970 Kolberg .............................. 524/521
4,200,125 4/1980 Hush et al. .......................... 428/36
4,350,796 9/1982 Oyama et al. ....................... 525/233
4,384,081 5/1983 Kubo et al. ......................... 525/338
4,404,329 9/1983 Maeda et al. ...................... 525/329.2
4,405,756 9/1983 Oyama ................................ 525/233

FOREIGN PATENT DOCUMENTS 132647 10/1979 Japan .

OTHER PUBLICATIONS

Derwent Abst. 21280 C/12, J55019525, (2-1980), Tokai Rubber.
Derwent Abst. 35870 K/15, J5803874, (3-1983), Nippon Zeon.
Derwent Abst. (Cited Al) 75618 B/42, DT2913992, (10-1979), Nippon Zeon.
Derwent Abst. 27640 K/12, DE3232692, (3-1983), Nippon Zeon.
Derwent Abst. 02549 J/48, EP-65144, (11-1982), Firestone.
Derwent Abst. 20314 K/09, DE3229871, (2-1983), Nippon Zeon

*Primary Examiner*—Herbert J. Lilling
*Attorney, Agent, or Firm*—Cushman, Darby & Cushman

[57] ABSTRACT

An oil resistant rubber hose having an internal layer made of a vulcanized rubber composition of, or composed mainly of, partially hydrogenated unsaturated nitrile-conjugated diene copolymer rubber in which at least 50% of the conjugated diene units is hydrogenated. This rubber hose is superior in resistance to deteriorated gasoline and low temperature, and is suitable for the automobile fuel line.

4 Claims, 1 Drawing Figure

RUBBER HOSE COMPRISING A LIQUID NITRILE-BUTADIENE COPOLYMER INCORPORATED INTO A PARTIALLY HYDROGENATED UNSATURATED ACRYLONITRILE-BUTADIENE COPOLYMER

BACKGROUND OF THE INVENTION

The present invention relates to a rubber hose having an oil rsistant internal layer which is superior in resistance to deteriorated gasoline, and low temperature. The rubber hose is suitable particularly for the automobile fuel line.

The present-day automobile fuel system, especially the one equipped with an electronic fuel-injection system, needs a fuel hose that resists deteriorated gasoline resulting from the increased engine temperature and fuel pressure. The fuel hose should have an internal layer which is resistant to the propagation of cracking caused by gasoline in contact at all times. In addition, the fuel hose has come to need low-temperature resistance with the spread of automobiles into cold districts. Heretofore, there has not been any rubber hose that meets all of such requirements.

SUMMARY OF THE INVENTION

It is an object of this invention to provide an oil resistant rubber hose which is superior in resistance to deteriorated gasoline and low temperature.

It is another object of this invention to provide an oil resistant rubber hose which is superior in resistance to the propagation of cracks in addition to resistance to deteriorated gasoline and low temperature.

The above-mentioned performance is achieved by forming at least the internal layer of the rubber hose with a vulcanized rubber composition of, or composed mainly of, partially hydrogenated unsaturated nitrile-conjugated diene copolymer rubber in which at least 50% of the conjugated diene units is hydrogenated.

DETAILED DESCRIPTION OF THE INVENTION

Figure 1:
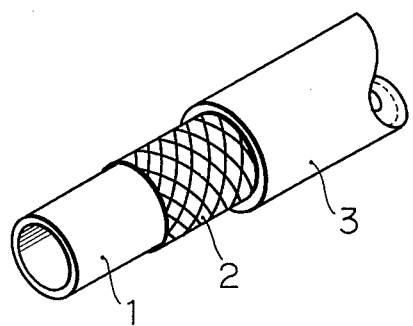
FIG. 1 is a perspective view showing one example of the rubber hose of this invention.

The present invention is described with reference to FIG. 1 which shows a fuel hose made up of an internal layer 1, a braided layer 2, and an external layer 3. The scope of the invention is not limited to a rubber hose of such structure, but embraces single layered or multilayered rubber hoses.

The internal layer 1 is made of a vulcanizate of partially hydrogenated unsaturated nitrile copolymer rubber (referred to as hydrogenated NBR) (A), or made of a vulcanizate of rubber composition (B), (C), or (D), (mentioned later) composed mainly of hydrogentated NBR.

(A) Hydrogenated NBR

Hydrogenated NBR is unsaturated nitrile-conjugated diene copolymer rubber produced by emulsion polymerization or solution polymerization, with at least 50% of the conjugated diene units hydrogenated. If the degree of hydrogenation is less than 50%, the properties such as resistance to deteriorated gasoline and low temperature are not improved as intended in this invention. 100% hydrogenation may be possible, but hydrogenation less than 98% is desirable for a proper cure rate in the case of sulfur vulcanization. The degree of hydrogenation is estimated from iodine value.

The copolymer rubber to be hydrogenated is prepared by copolymerizing an unsaturated nitrile such as acrylonitrile and methacrylonitrile with at least one of conjugated dienes such as 1,3-butadiene, isoprene, and 1,3-pentadiene, or by copolymerizing the above-mentioned unsaturated nitrile with a conjugated diene partly substituted with an unsaturated carboxylic acid ester such as methyl ester, butyl ester, and 2-ethyl ester of acrylic acid, methacrylic acid, fumaric acid, or itaconic acid, or with N-methylol acrylamide. Examples of such copolymer rubbers include acrylonitrile-butadiene copolymer rubber, acrylonitrile-isoprene copolymer rubber, acrylonitrile-butadiene-isoprene copolymer rubber, acrylonitrile-butadiene-methyl acrylate copolymer rubber, and acrylonitrile-butadiene-butyl acrylate copolymer rubber. Most suitable among them is acrylonitrile-butadiene copolymer rubber (NBR).

The quantity of the unsaturated nitrile in the hydrogenated NBR is usually 10 to 70 wt.%, and it is determined properly according to the object of use.

(B) A rubber compound composed of hydrogenated NBR (A) and polyvinyl chloride resin (referred to as PVC hereunder).

The PVC includes polyvinyl chloride and copolymers of vinyl chloride and vinyl acetate or other monoolefin monomers. The PVC is incorporated into the hydrogenated NBR in an amount greater than 5 wt%, preferably in an amount of about 20 wt% (inner percentage). If the quantity is less than 5 wt%, the effect of improving the resistance to deteriorated gasoline is not sufficient. The more is incorporated the PVC, the more is enhanced the resin-attributable properties. Thus, as a matter of course, there is a limit at which the rubber composition can be vulcanized but the properties of rubber are impaired. The quantity of PVC to be incorporated should be determined according to the intended use and required performance. The upper limit is usually 60 wt%. Incorporation of PVC into hydrogenated NBR is accomplished by mixing with a roll or Banbury mixer or by mixing in a solution, followed by coprecipitation and drying.

(C) A rubber compound composed of hydrogenated NBR (A) and liquid unsaturated nitrile-conjugated diene copolymer having a number-average molecular weight of 500 to 10,000 (referred to as liquid NBR hereunder).

For good miscibility with hydrogenated NBR and for improved properties intended in this invention, the liquid NBR is composed of 10 to 70 wt%, preferably 20 to 50 wt%, of unsaturated nitrile, 20 to 80 wt%, preferably 25 to 75 wt%, of conjugated diene, and 0 to 20 wt%, preferably 0.1 to 15 wt%, of vinyl monomer which is copolymerizable with unsaturated nitrile and conjugated diene. The unsaturated nitrile and conjugated diene are as mentioned under the paragraph for hydrogenated NBR. Preferable unsaturated nitrile is acrylonitrile and preferable conjugated diene is batadiene or isoprene. The vinyl monomer copolymerizable with the unsaturated nitrile and conjugated diene includes, for example, unsaturated carboxylic acids such as acrylic acid, methacrylic acid, and itaconic acid and esters thereof, vinyl pyridine monomer such as 2-vinylpyridine, and N-methylol acrylamide. Preferable among them are acrylic acid and methacrylic acid.

If the liquid NBR has a number-average molecular weight smaller than 500, the resulting rubber composition is easily attacked by solvent and poor in resistance to the propagation of cracks. On the other hand, if the number-average molecular weight exceeds 10,000, the effect of improving resistance to the propagation of cracks is not obtained. A preferable value is from 1000 to 5000. The liquid NBR is incorporated into the hydrogenated NBR in an amount greater than 2 wt%, (inner percentage). If the quantity is less than 2 wt%, the effect of liquid NBR is not sufficient. The upper limit is about 50 wt%, at which the resulting rubber composition is excessively low in viscosity and the physical properties such as permanent compression set become poor. Incorporation of liquid NBR into hydrogenated NBR may be accomplished in the same way as mentioned in the above paragraph (B).

(D) A rubber compound composed of hydrogenated NBR (A), liquid NBR, and PVC

The PVC and the quantity and method of its incorporation are as mentioned in the above paragraph (B). That is to say, the PVC includes polyvinyl chloride and copolymers of vinyl chloride and vinyl acetate or other monoolefin monomers. The PVC is incorporated into the composition composed of hydrogenated NBR and liquid NBR in an amount greater than 5 wt%, preferably in an amount of about 20 wt% (inner percentage).

The above-mentioned hydrogenated NBR (A), or the rubber compound (B), (C), or (D) composed mainly of hydrogenated NBR may be incorporated with commonly used auxiliary materials including inorganic fillers such as carbon black, silica, and metal oxide, organic fillers such as lignin, softener, plasticizer, antioxidant, and colorant, together with a proper amount of sulfur or peroxide vulcanizing agent.

The above-mentioned rubber material (A), (B), (C), or (D) is formed by extrusion into the internal layer 1 of the rubber hose of this invention. On the internal layer is formed the braided layer 2. The braided layer is coated with an adhesive and then covered with the external layer 3 extruded thereon. The rubber material for the external layer is not specifically restricted, ant it may be the same as or different from that used for the internal layer. Synthetic rubbers such as CSM, CR, and CHR, which are good in weather resistance, can be used. Vulcanization should be performed at 145° to 170° C. for 30 to 90 minutes.

The invention is now described with reference to Examples and Comparative Examples.

The test pieces in Examples and Comparative Examples were prepared from the rubber materials compounded as shown in Table 1. The rubber material was extruded into a tube, 9.5 mm in outside diameter and 1.0 mm thick, which was then vulcanized at 150° C. for 30 minutes. Test pieces were punched out from these vulcanized tubes. The tests for properties were carried out according to the following methods. The results are shown in Tables 2 and 3.

(1) Dry physical properties
Measured according to JIS K-6301 (test pieces; dumbbell No. 3)

(2) Resistance to deteriorated gasoline
Test pieces were dipped in JIS fuel C containing 1 wt% of lauroyl peroxide at 70° C. The fuel was renewed every 24 hours (1 cycle). At the end of the specified number of cycles, test pieces were measured for physical properties according to JIS K-6301 after drying at room temperature for 24 hours and further drying under reduced pressure at 60° C.

(3) Resistance to propagation of cracks
A test piece, dumbbell JIS No. 1, with a 2 mm long crack made at the center of two marks 40 mm apart, was stretched 50% (so that the distance between the marks is increased to 60 mm) by a proper tool, and the stretched test piece was dipped in JIS fuel D at 40° C. The time for the test piece to break was measured.

(4) Heat aging resistance
Test pieces, dumbbell JIS No. 3, were measured for physical properties according to JIS K-6301 before and after heat aging at 120° C. for 70 hours (or 288 hours), and the rate of change as compared with the dry physical properties is expressed as $\Delta T_B$, $\Delta E_B$, and $\Delta H_S$ for break strength, elongation at break, and hardness, respectively.

(5) Low-temperature resistance
The impact brittleness temperature was measured according to JIS K-6301.

(6) Gasoline resistance
A test piece measuring $20 \times 20 \times 1$ mm was dipped in JIS fuel C. at 40° C. for 48 hours, and the rate of change of the volume before and after dipping is shown.

(7) Gasohol resistance
A test piece measuring $20 \times 20 \times 1$ mm was dipped in JIS fuel C containing 20 vol% of methanol at 40° C. for 48 hours, and the rate of change of the volume before and after dipping is shown.

It is to be noted from Table 2 that the internal layer of the rubber hose of this invention (Examples 1 to 6) outperforms that made of ordinary NBR (Comparative Examples 1 to 3) in resistance to deteriorated gasoline and low-temperature resistance and is in no way inferior in dry physical properties. The internal layers made of PVC-containing hydrogenated NBR compound (Examples 2 to 6) are improved as compared with that made of hydrogenated NBR alone (Example 1) in dry physical properties and gasoline resistance.

It is to be noted from Table 3 that the internal layer of the rubber hose of this invention (Examples 7 to 10) are superior in resistance to deteriorated gasoline, resistance to propagation of cracks, low-temperature resistance, dry physical properties, and heat resistance. The internal layers made of ordinary NBR incorporated with liquid NBR or liquid NBR and PVC (Comparative Examples 4 and 5) do not exhibit the effect of this invention. It is also to be noted from Example 1 that hydrogenated NBR alone is not satisfactory in resistance to propagation of cracks.

TABLE 1

| | Example No. | | | | | | | | | | Comparative Example No. | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Composition of raw material rubber | | | | | | | | | | | | | | | |
| Hydrogenated NBR *1 | 100 | 90 | 80 | 70 | 60 | 50 | 90 | 80 | 80 | 70 | | | | | |
| NBR *2 | | | | | | | | | | | 100 | 90 | 70 | | |
| NBR *3 | | | | | | | | | | | | | | 90 | 70 |
| Liquid NBR *4 | | | | | | | 10 | 20 | 5 | 5 | | | | 10 | 5 |

TABLE 1-continued

| | Example No. | | | | | | | | | | Comparative Example No. | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| PVC *5 | | 10 | 20 | 30 | 40 | 50 | | | 15 | 25 | | 10 | 30 | | 25 |
| MAF carbon black | 60 | 54 | 48 | 42 | 36 | 30 | 60 | 60 | 51 | 42 | 80 | 74 | 62 | 75 | 52 |
| Plasticizer *6 | 25 | 27 | 29 | 31 | 33 | 35 | 20 | 20 | 23 | 25 | 25 | 27 | 31 | 20 | 25 |
| Zinc oxide | 5 | 5 | 5 | 5 | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 | 1 | 1 | 1 | 1 |
| Sulfur powder | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Vulcanization accelerator | | | | | | | | | | | | | | | |
| TET *7 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| TMT *8 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| MBT *9 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

Note to Table 1
*1 Rate of hydrogenation: 90%
Quantity of acrylonitrile: 45 wt %
Viscosity $ML_{1+4}$ (100° C.): 85
*2 Nipol DN-101 (product of Nippon Zeon Co., Ltd.) containing 41 wt % of acrylonitrile
*3 Nipol DN-101L (product of Nippon Zeon Co., Ltd.) containing 42 wt % of acrylonitrile
*4 Nipol 1312J (product of Nippon Zeon Co., Ltd.)
*5 Zeon 103 EP-8 (product of Nippon Zeon Co., Ltd.)
*6 Dibutoxyethoxyethyl adipate
*7 TET: tetraethylthiuram disulfide
*8 TMT: tetramethylthiuram monosulfide
*9 MBT: 2-mercaptobenzothiazole

TABLE 2

| Test Items | | Example No. | | | | | | Comparative Example No. | | |
|---|---|---|---|---|---|---|---|---|---|---|
| | | 1 | 2 | 3 | 4 | 5 | 6 | 1 | 2 | 3 |
| <Dry physical properties> | | | | | | | | | | |
| $T_B$ (kgf/cm²) | | 185 | 193 | 220 | 238 | 249 | 263 | 138 | 150 | 165 |
| $E_B$ (%) | | 570 | 540 | 500 | 480 | 460 | 450 | 440 | 390 | 340 |
| $H_S$ (JIS A) | | 72 | 73 | 72 | 72 | 73 | 72 | 72 | 73 | 74 |
| <Resistance to deteriorated gasoline> | | | | | | | | | | |
| $T_B$ (kgf/cm²) | 0 cycle | 212 | 237 | 261 | 289 | 305 | 321 | 137 | 160 | 175 |
| | 2 cycles | 180 | 191 | 209 | 225 | 222 | 232 | 47 | 56 | 69 |
| | 8 cycles | 121 | 134 | 146 | 156 | 163 | 175 | 40 | 47 | 58 |
| $E_B$ (%) | 0 cycle | 550 | 520 | 470 | 450 | 430 | 410 | 450 | 390 | 330 |
| | 2 cycles | 430 | 420 | 400 | 390 | 360 | 340 | 50 | 50 | 40 |
| | 8 cycles | 260 | 260 | 270 | 280 | 290 | 300 | 40 | 30 | 30 |
| $E_C$ (%) | 0 cycle | — | — | — | — | — | — | — | — | — |
| | 2 cycles | — | — | — | — | — | — | 20 | 30 | 30 |
| | 8 cycles | 220 | 220 | 230 | 230 | 250 | 260 | 10 | 10 | 10 |
| <Low-temperature resistance> | | | | | | | | | | |
| Impact brittleness point (°C.) | | −48 | −48 | −48 | −48 | −49 | −48 | −37 | −36 | −37 |
| <Heat aging resistance> at 120° C. for 70 hours | | | | | | | | | | |
| $\Delta H_S$ (JIS A) | | +8 | +8 | +9 | +8 | +8 | +8 | +9 | +8 | +9 |
| $\Delta T_B$ (%) | | +4 | +12 | +10 | +13 | +13 | +6 | +15 | +12 | +14 |
| $\Delta E_B$ (%) | | −28 | −29 | −31 | −29 | −26 | −27 | −32 | −40 | −57 |
| <Resistance to propagation of cracks> | | | | | | | | | | |
| Time to break (sec) | | 204 | 250 | 288 | 328 | 350 | 667 | 220 | 265 | 370 |
| <Gasoline resistance> | | | | | | | | | | |
| $\Delta V$ (%) | | 10 | 8 | 7 | 5 | 3 | 2 | 6 | 5 | 3 |
| <Gasohol resistance> | | | | | | | | | | |
| $\Delta V$ (%) | | 37 | 30 | 27 | 23 | 20 | 12 | 34 | 30 | 19 |

Note: "—" sign in $E_C$ indicates no cracking.

TABLE 3

| Test Items | | Example No. | | | | Comparative Example No. | |
|---|---|---|---|---|---|---|---|
| | | 7 | 8 | 9 | 10 | 4 | 5 |
| <Dry physical properties> | | | | | | | |
| $T_B$ (kgf/cm²) | | 190 | 168 | 213 | 238 | 105 | 167 |
| $E_B$ (%) | | 820 | 810 | 600 | 480 | 580 | 590 |
| $H_S$ (JIS A) | | 69 | 67 | 71 | 72 | 72 | 69 |
| <Resistance to deteriorated gasoline> | | | | | | | |
| $T_B$ (kgf/cm²) | 1 cycle | 176 | 153 | 219 | 225 | 40 | 96 |
| | 2 cycles | 159 | 136 | 229 | 225 | 38 | 56 |
| | 4 cycles | 135 | 111 | 232 | 197 | 32 | 38 |
| $E_B$ (%) | 1 cycle | 760 | 770 | 510 | 430 | 80 | 460 |
| | 2 cycles | 620 | 590 | 490 | 390 | 60 | 260 |
| | 4 cycles | 490 | 450 | 510 | 350 | 20 | 190 |
| $E_C$ (%) | 1 cycle | — | — | — | — | 60 | 280 |
| | 2 cycles | — | — | — | — | 40 | 120 |
| | 4 cycles | 460 | 410 | — | — | * | 20 |
| <Resistance to propagation of cracks> | | | | | | | |

TABLE 3-continued

| Test Items | Example No. 7 | 8 | 9 | 10 | Comparative Example No. 4 | 5 |
|---|---|---|---|---|---|---|
| Time to break (sec) | 13800 | 5380 | $10^6$ up | $10^6$ up | 133 | 245 |
| <Heat aging resistance> at 120° C. for 70 hours | | | | | | |
| $\Delta T_B$ (%) | −3 | −2 | −1 | −6 | +5 | −8 |
| $\Delta E_B$ (%) | −27 | −29 | −19 | −22 | −38 | −19 |
| $\Delta H_S$ (JIS A) | +6 | +7 | +6 | +9 | +11 | +5 |
| at 120° C. for 288 hours | | | | | | |
| $\Delta T_B$ (%) | +8 | +10 | +3 | ±0 | +17 | −7 |
| $\Delta E_B$ (%) | −37 | −40 | −37 | −54 | −81 | −81 |
| $\Delta H_S$ (JIS A) | +14 | +16 | +16 | +20 | +23 | +21 |
| <Low-temperature resistance> | | | | | | |
| Impact brittleness point (°C.) | −46 | −49 | −47 | −49 | −29 | −31 |
| <Gasoline resistance> | | | | | | |
| $\Delta V$ (%) | 10 | 11 | 8 | 7 | 8 | 5 |
| <Gasohol resistance> | | | | | | |
| $\Delta V$ (%) | 38 | 40 | 29 | 25 | 36 | 21 |

Note to Table 3
(1) $T_B$: Break strength
$E_B$: Elongation at break
$H_S$: Hardness
$E_C$: Elongation to cause cracking
(2) "−" sign in $E_C$ indicated no cracking.
(3) * Cracking in the dry state.

What is claimed is:

1. A rubber hose having the internal layer made of a vulcanized rubber composition of partially hydrogenated unsaturated nitrile-conjugated diene copolymer rubber in which at least 50% of the conjugated diene units are hydrogenated, said copolymer rubber being incorporated with more than 2 wt% of liquid unsaturated nitrile-conjugated diene copolymer having a number-average molecular weight of 500 to 10,000.

2. A rubber hose as claimed in claim 1, wherein the unsaturated nitrile-conjugated diene copolymer rubber to be hydrogated contains 10 to 70 wt% of unsaturated nitrile, and the liquid unsaturated nitrile-conjugated diene copolymer is composed of 10 to 70 wt% of unsaturated nitrile, 20 to 80 wt% of conjugated diene, and 0 to 20 wt% of vinyl monomer copolymerizable with the unsaturated nitrile and conjugated diene.

3. A rubber hose having the internal layer made of a vulcanized rubber composition of partially hydrogenated unsaturated nitrile-conjugated diene copolymer rubber in which at least 50% of the conjugated diene units are hydrogenated, said copolymer rubber being incorporated with more than 2 wt% of liquid unsaturated nitrile-conjugated diene copolymer having a number-average molecular weight of 500 to 10,000 and more than 5 wt% of polyvinyl chloride resin.

4. A rubber hose as claimed in claim 3, wherein the unsaturated nitrile-conjugated diene copolymer rubber to be hydrogenated contains 10 to 70 wt% of unsaturated nitrile, and the liquid unsaturated nitrile-conjugated diene copolymer is composed of 10 to 70 wt% of unsaturated nitrile, 20 to 80 wt% of conjugated diene, and 0 to 20 wt% of vinyl monomer copolymerizable with the unsaturated nitrile and conjugated diene.

* * * * *